United States Patent [19]
Calcagno et al.

[11] 3,714,237
[45] Jan. 30, 1973

[54] PROCESS FOR PREPARING VINYL ACETATE

[75] Inventors: Benedetto Calcagno, Milan; Claudio Divo, Saronno (Varese); Marcello Ghirga, Bresso (Milan), all of Italy

[73] Assignee: Societa' Italiana Resine S.p.A, Milan, Italy

[22] Filed: Dec. 10, 1969

[21] Appl. No.: 884,007

[52] U.S. Cl. ................................................260/497 A
[51] Int. Cl. .................................................C07c 67/04
[58] Field of Search ......................................260/497 A

[56] References Cited

UNITED STATES PATENTS 3,461,157   4/1969   Olivier et al. ....................260/497 A

FOREIGN PATENTS OR APPLICATIONS 1,117,595   6/1968   Great Britain ....................260/497 A
771,193    11/1967   Canada ............................260/497 A

OTHER PUBLICATIONS

International Critical Tables, Vol. III, pp. 254, 255 & 265.
McCabe & Smith, Unit Operation of Chem. Engineering, 2nd Ed., McGraw-Hill (1967) pp. 517 & 639.

*Primary Examiner*—Lorraine A. Weinberger
*Assistant Examiner*—Richard D. Kelly
*Attorney*—Sughrue, Rothwell, Mion, Zinn & Macpeak

[57] ABSTRACT

In the catalytic production of vinyl acetate from ethylene and acetic acid in the presence of oxygen, the improvement consisting in absorbing by-products, from the gases leaving the reaction vessel, in acetic acid with subsequent recovery of gases absorbed in the acetic acid and separation of ethylene therefrom.

8 Claims, No Drawings

PROCESS FOR PREPARING VINYL ACETATE

The present invention relates to a method of producing vinyl acetate from ethylene.

As is well known, vinyl acetate can be produced by the catalytic oxidation of ethylene in the presence of acetic acid. This is normally done at high temperature and pressure, ethylene and oxygen or an oxygen-containing gas being fed over a catalyst consisting of salts of palladium and copper and acetates or halides of alkali metals or alkaline earths, the salts being dissolved and/or suspended in acetic acid.

Since the conversion taking place during the passage of the reagents is generally only partial, it is necessary to re-cycle the gas that has failed to react, which must therefore be separated from the by-products of the reaction, especially carbon dioxide and halogen compounds.

Hitherto, to avoid the accumulation of by-products, the re-cycled gases have been blown-off frequently or purified by one of the methods of purification normally employed for the purpose.

Both solutions are open to objection. Thus, while the discharge of part of the re-cycled gases results in considerable loss of ethylene, the normal methods of purification have a marked effect on costs, because of the large amounts of gas to be treated, and add to the complication of the work and equipment.

A simple and inexpensive method has now been discovered, whereby the drawbacks inherent in the present state of the art can be reduced or overcome and it is possible, in the process of producing vinyl acetate by the catalytic oxidation of ethylene in the presence of acetic acid, to avoid the accumulation of by-products in the re-cycled gas.

This method, which constitutes the present invention, consists essentially in absorbing the by-products, contained in the gas discharged from the reaction vessel in which the vinyl acetate is being synthesized, in solutions consisting essentially of acetic acid, operating at pressures above atmospheric, and at or above ambient temperature. It has been found that in these conditions the gases dissolved in the acetic solution are richer in impurities than those emerging from the container in which the vinyl acetate is being produced.

The dissolved gas is then separated from the acetic solution and normally used for recovery of the ethylene contained in it by the usual methods of purification. This has the advantage that the amounts of gas treated by purification are greatly reduced, in addition to which the accumulation of by-products in the reaction gas mixture is avoided without the drawbacks experienced hitherto.

In the recommended form of the present invention, by way of solutions for absorbing the by-products contained in the gas of reaction, use is made of the solutions obtained by condensing the normally liquid substances contained in the gases from the container in which the vinyl acetate is being produced, these solutions being enriched in acetic acid, so that the acid content of the solution is preferably not less than 40 percent by weight or, better still, not less than 50 percent by weight.

In the recommended form of the invention, the substances condensed from the gases leaving the container in which the vinyl acetate is being produced are enriched by the addition of enough acetic acid to offset the acid consumed in the reaction.

More particularly, according to the method here proposed, ethylene and oxygen, fed separately and/or mixed together so that the volumetric ratio of ethylene to oxygen lies between 9:1 and 21:1 and preferably between 14:1 and 18:1, are passed through an acetic acid solution containing a catalytic mixture dissolved and/or in suspension, in a suitable reaction vessel. The catalytic mixture consists of a palladium salt, preferably the chloride, at a concentration of between 0.001 and 0.05 mols/liter, a copper salt, preferably the chloride, at a concentration of between 0.10 and 0.75 mols/liter, and an acetate of an alkali metal or alkaline earth, preferably lithium acetate, at a concentration of between 0.6 and 1.8 mols/liter, and possibly also such reaction promoters as, for example, vanadium salts, which are used in concentrations of between 0.001 and 0.1 mols/liter. The temperature should be between 50° C. and 200° C., and preferably between 80° C. and 160° C. or, better still, between 100° C. and 130° C., while the pressure should be between 1 and 80 atmospheres and preferably between 20 and 70 atmospheres. After cooling, the gases coming from the container in which the vinyl acetate is being prepared are passed into the acetic solutions at a temperature of between 20° C. and 50° C. and preferably between 25° C. and 35°C., and at a pressure of from 1 to 80 atm. and preferably from 20 to 70 atm. One should normally operate at a pressure equal to that used in the container in which the vinyl acetate is being produced.

In that way, the content of by-products in the reaction gas can be maintained at a constant value of less than 20 percent and preferably below 10 percent by volume, referred to carbon dioxide, when the quantity of absorptive solution used is such that the weight ratio of solution to the carbon dioxide contained in the gases subjected to purification lies between 30 and 150 and preferably between 50 and 100.

When the pressures used during the absorption of the carbon dioxide are less than those stated above, the products condensed from the gases taken from the container in which the vinyl acetate is being produced are enriched by the addition of acetic acid in excess of the amount needed to offset the consumption of acid in the reaction.

While the unabsorbed gas is re-cycled to the container in which the vinyl acetate is being produced, the absorptive solution is freed — in a stripping column, for example — from the gases dissolved in it, which, after being subjected to one of the usual purification processes, can be passed, along with the purified gas from the absorptive solution, to the container in which the vinyl acetate is being produced.

While the vinyl acetate is separated from the solution already de-gassed and purified by the usual processes, the residual solution, consisting to all intents and purposes entirely of acetic acid, is passed to the container in which the vinyl acetate is being produced.

EXAMPLE

In a pilot plant, a reaction vessel having a capacity of 10 liters and containing 7 liters of acetic acid, 5.2 g. of palladium chloride, 280 g. of copper chloride and 154 g. of lithium acetate was fed with ethylene at about 0.6 cu.m./hour, oxygen at about 0.36 cu.m./hour and recycled gas at about 22 cu.m./hour, so as to produce within that vessel a reaction mixture of approximately the following composition: 87.8 percent of ethylene, 7.3 percent of carbon dioxide and 4.9% of oxygen. The operating pressure was maintained at 30 atmosphere and the reaction temperature at 125°C.

The gases leaving the container in which the vinyl acetate was being produced and having a carbon dioxide content of about 7.4 percent were brought to a temperature of 30° C. and then passed at 30 atm. pressure in an oxidation column through approximately 6,300 g. of a liquid solution of which some 78 percent weight consisted of the condensation products from the gas taken from the container in which the vinyl acetate was being produced, while the remainder consisted of acetic acid fed separately at the rate of about 1,400 g./hour.

While the gas leaving the absorption column was recycled to the container in which the vinyl acetate was being produced, the absorptive solution was sent to a stripping column, in which it was freed from the gases dissolved in it.

The gases, evolved with a carbon dioxide content of approximately 11.9 percent, were fed at the rate of about 305 liters an hour to a charging column, in counterflow to an aqueous solution of 8 percent sodium hydroxide, and then, together with the gas from the acetic acid absorption column, were passed to the container in which the vinyl acetate was being produced.

The solution emerging from the stripping column, on the other hand, was passed to a column in which the vinyl acetate was separated by distillation.

The liquid distillation residue, consisting to all intents and purposes entirely of acetic acid, was pumped to the container in which the vinyl acetate was being prepared, at a feed rate of approximately 23 mols/hour.

In this experiment, some 3 percent in mols of the ethylene was converted to vinyl acetate at every pass, the ethylene selectivity being approximately 85 percent.

What we claim is:

1. In a method of producing vinyl acetate in the liquid phase by feeding ethylene and oxygen or an oxygen-containing gas, at a temperature and pressure sufficient for reaction, into an acetic acid suspension of catalytic salts consisting essentially of suspended in acetic acid, a palladium salt, a copper salt and an acetate selected from the group consisting of alkali metal acetates and alkaline earth metal acetates, to obtain a gaseous reaction product containing vinyl acetate, condensing the normally liquid substances in the gaseous reaction product and recycling the non-condensed gaseous reaction product to the reaction whereby reaction by-products accumulate in the recycle gas, the improvement comprising avoiding the accumulation of by-products in the recycle gas by a process which comprises a. absorbing vinyl acetate and the by-products contained in the recycle non-condensed gaseous reaction products in a solution consisting essentially of the condensed portion of the gaseous reaction product and additional acetic acid sufficient to provide an acetic acid content in said solution of at least 40 percent by weight and directly recycling the non-absorbed gas to the reaction whereby the $CO_2$ content in the recycle gas is less than 20 percent by volume;

b. separating from said solution, after the absorption, the gases dissolved therein and recovering ethylene from the separated gases;

c. recovering from the solution the vinyl acetate contained therein, and d. recycling the remaining solution to the reaction.

2. The method in claim 1 wherein the acetic acid content is at least 50 percent by weight.

3. The method in claim 1 wherein the substances condensed from the gases from the reaction vessel in which the vinyl acetate is being produced receive an addition of acetic acid sufficient to offset the acid consumed by the reaction.

4. The method in claim 1 wherein the amount of absorptive solution used is such that the weight ratio of solution to the carbon dioxide contained in the gases subjected to purification is between 30 and 150:1, the temperature being between 20° C and 50° C and the pressure between 1 and 80 atmospheres.

5. The method in claim 4 wherein the weight ratio is between 50 and 100:1, the temperature being between 25°C and 35+ C and the pressure between 20 and 70 atmospheres.

6. The method of claim 1 wherein the palladium salt is present in a concentration of 0.001 to 0.05 moles per liter, the copper salt is present in a concentration of 0.10 to 0.75 moles per liter, the acetate is present in a concentration of between 0.6 and 1.8 moles per liter and the reaction temperature is between 50° C and 200° C at a pressure between 1 and 80 atmospheres.

7. The method in claim 1 wherein the ethylene recovered from said separated gases is recycled back to the reaction vessel.

8. The method of claim 1 wherein all the vinyl acetate leaving said vinyl acetate reaction vessel is contacted in an absorption section with said solutions consisting of not less than 40 percent by weight of acetic acid, whereby the unabsorbed gases leaving said absorption section are recycled back to the reaction vessel and whereby the by-product carbon dioxide content in said unabsorbed gases is reduced.

* * * * *